US008612773B2

(12) United States Patent
Nataraj et al.

(10) Patent No.: US 8,612,773 B2
(45) Date of Patent: Dec. 17, 2013

(54) METHOD AND SYSTEM FOR SOFTWARE INSTALLATION

(75) Inventors: Pruthvi Panyam Nataraj, Karnataka (IN); Bipin Tomar, Karnataka (IN); Arun Prasath Anbalagan, Austin, TX (US); Eduardo Lazaro Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1534 days.

(21) Appl. No.: 11/743,789

(22) Filed: May 3, 2007

(65) Prior Publication Data
US 2008/0276301 A1    Nov. 6, 2008

(51) Int. Cl.
*H04L 29/06* (2006.01)

(52) U.S. Cl.
USPC ........... 713/192; 713/161; 713/165; 713/170; 713/187; 713/191; 726/2; 726/26; 726/27; 726/30; 717/168; 717/169; 717/172; 717/173; 717/177

(58) Field of Classification Search
USPC ................. 713/161, 165, 170, 187, 191, 192; 717/168, 169, 172, 173, 174, 175, 177, 717/178; 726/2, 26, 27, 30
See application file for complete search history.

(56) References Cited

U.S. PATENT DOCUMENTS

| 5,982,891 | A | * | 11/1999 | Ginter et al. ................. 705/54 |
|---|---|---|---|---|
| 6,052,732 | A | | 4/2000 | Gosling |
| 6,078,951 | A | | 6/2000 | Pashupathy et al. |
| 6,256,668 | B1 | * | 7/2001 | Slivka et al. ................. 709/220 |
| 6,347,398 | B1 | | 2/2002 | Parthasarathy et al. |
| 6,381,741 | B1 | | 4/2002 | Shaw |
| 6,944,772 | B2 | | 9/2005 | Dozortsev |
| 7,055,036 | B2 | | 5/2006 | Kouznetsov et al. |
| 7,484,105 | B2 | * | 1/2009 | Goodman et al. ............ 713/191 |
| 7,774,619 | B2 | * | 8/2010 | Paaske et al. ................. 713/191 |
| 2001/0032310 | A1 | | 10/2001 | Corella |
| 2002/0073310 | A1 | | 6/2002 | Benantar |
| 2002/0100036 | A1 | | 7/2002 | Moshir et al. |
| 2006/0031381 | A1 | * | 2/2006 | Van Luijt et al. ............ 709/217 |
| 2006/0085844 | A1 | * | 4/2006 | Buer et al. ....................... 726/4 |
| 2008/0046758 | A1 | * | 2/2008 | Cha et al. ..................... 713/189 |
| 2008/0098212 | A1 | * | 4/2008 | Helms et al. ................. 713/155 |
| 2008/0270781 | A1 | * | 10/2008 | Ibrahim et al. ................... 713/2 |

FOREIGN PATENT DOCUMENTS

| WO | WO 0153937 | 7/2001 |
|---|---|---|
| WO | WO03093959 A3 | 11/2003 |
| WO | WO2004072825 A2 | 8/2004 |

* cited by examiner

*Primary Examiner* — Jeffrey Pwu
*Assistant Examiner* — Thomas C Lauzon
(74) *Attorney, Agent, or Firm* — David Mims; Mark P Kahler

(57) ABSTRACT

A network based installation management system that dynamically manages secure software installation on a client. The server is configured to determine the software required and prepare an appropriated response containing the list of software and an information file containing the respective attributes of the list of software. The server encoded this response and the encoded response is transmitted to the client. The client on receiving the response is configured to authenticate the response and install the encoded response after authentication. Highly accurate and reliable software installation using the network based installation management system may be achieved using a respective hardware element on the client and the server, which is configured to encode and decode a request and/or response suitably thereby providing a high level of security and trust in an un-trusted network environment.

10 Claims, 5 Drawing Sheets

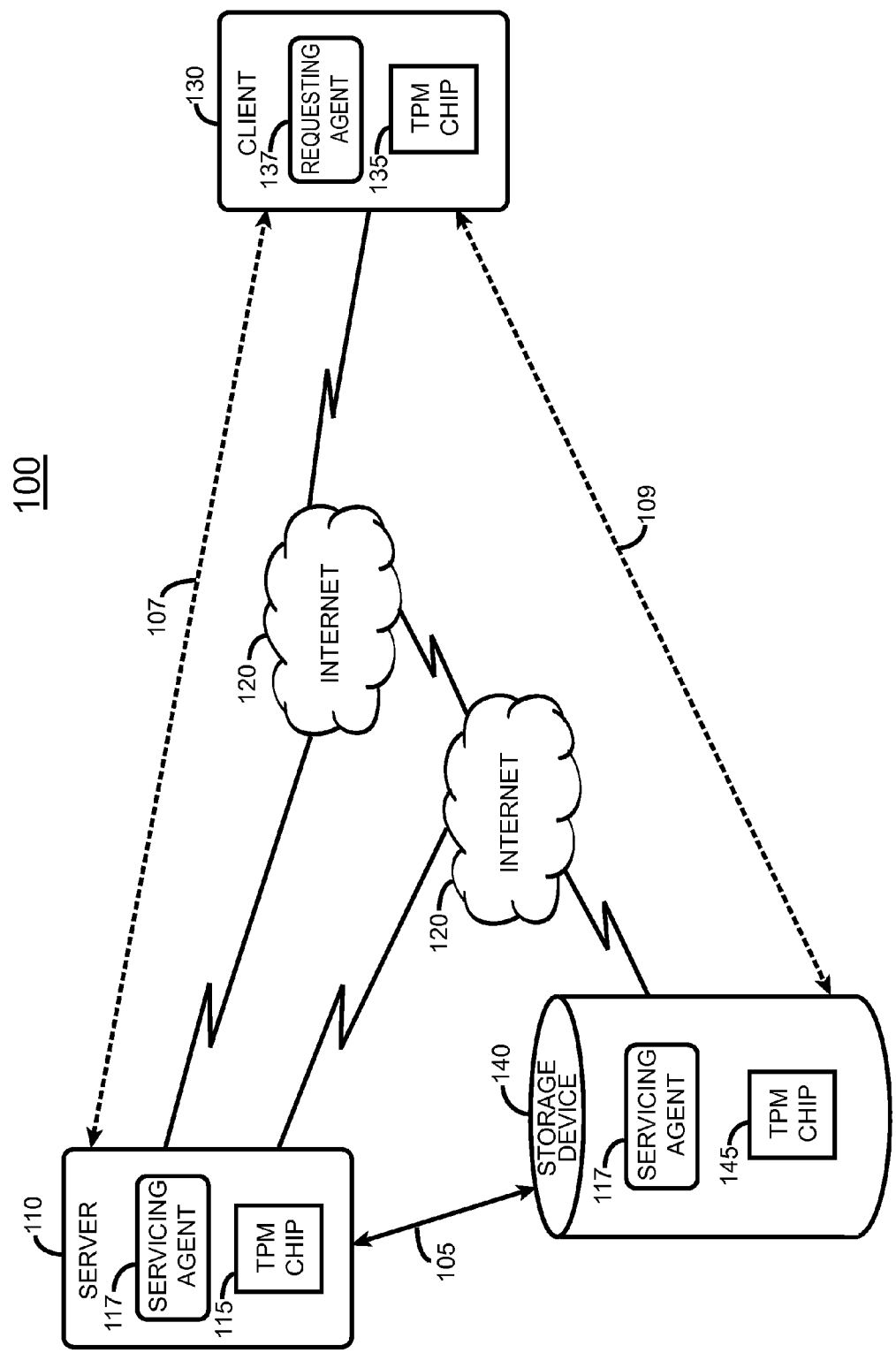

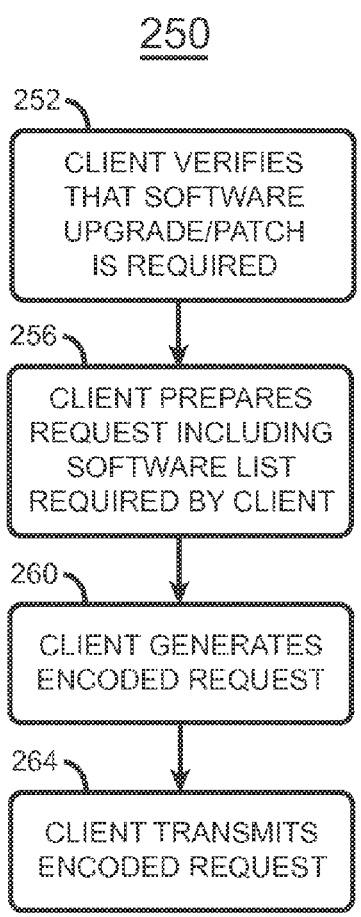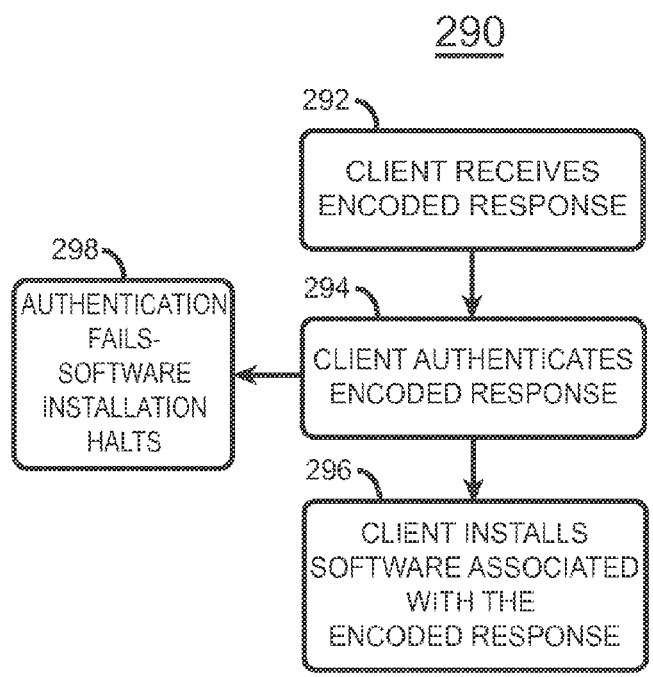

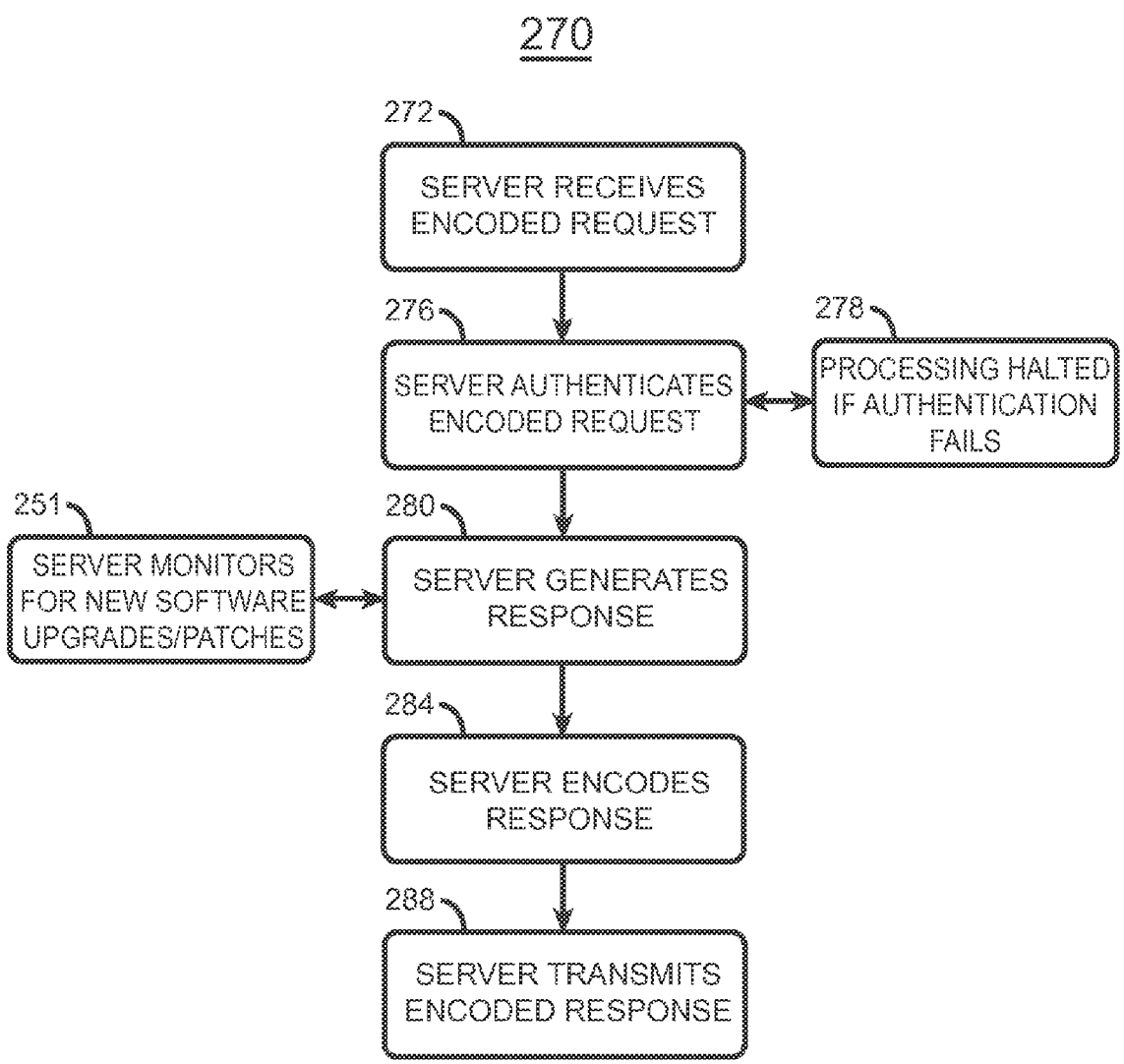

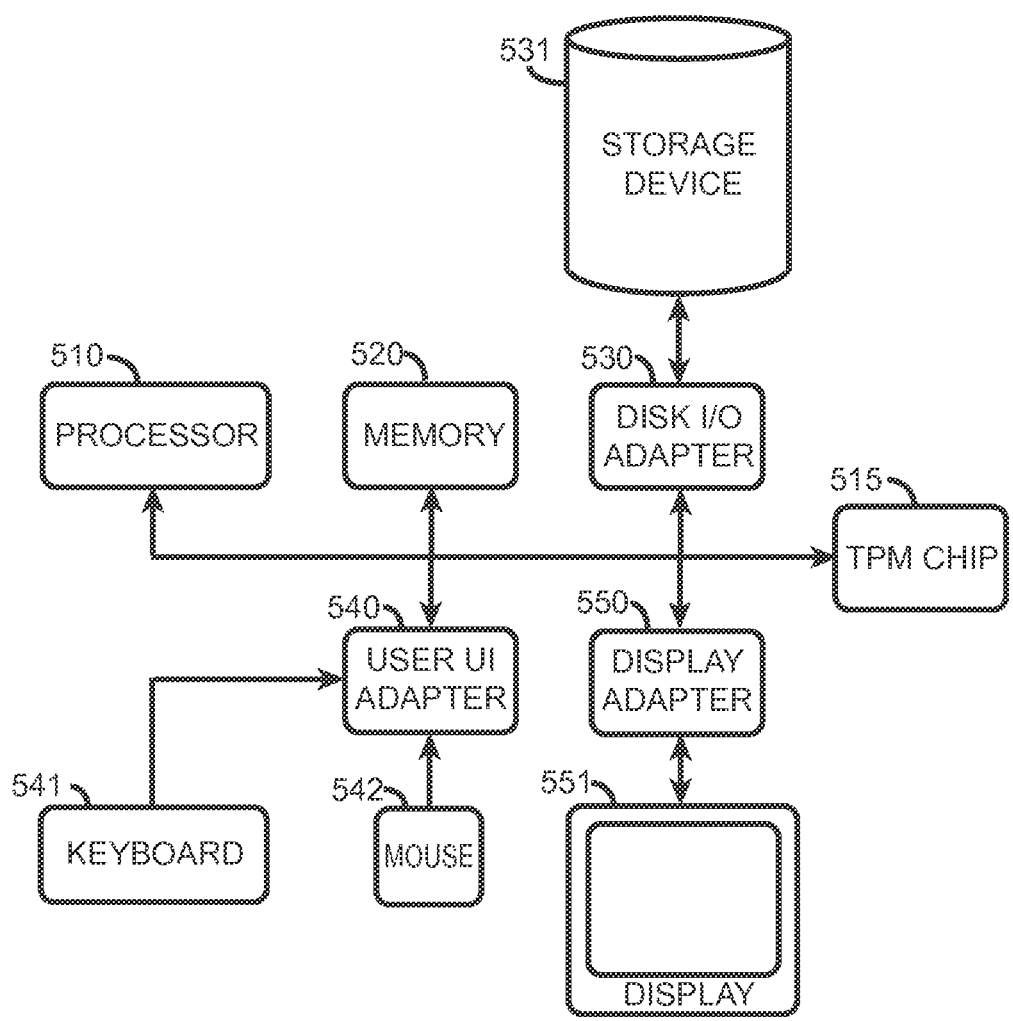

METHOD AND SYSTEM FOR SOFTWARE INSTALLATION

FIELD OF THE INVENTION

This invention generally relates to an improved network based installation management system suitable for use over an un-trusted network environment.

BACKGROUND OF THE INVENTION

Software installation is a challenging task for most vendors. Typically, vendors need to provide a mechanism for installing software that is performed securely from a server. The server may be hosted by the vendor or at a remote location. To ease the process of software installation on a client, software installations are typically made over a private and/or a public network connecting the client with the server. For example, the server and the client are coupled via the Internet, where the Internet has emerged as a preferred transmission medium.

In typical network based software installations, the client identifies the required software to be installed and transmits a request to the server for the software products. The software products are transmitted to the client over a network and then installed on the client. Installing the received software on the client may be performed with or without human intervention. Security of the network finds importance, where for example, software such as an anti-virus product update and/or a security patch needs to be installed on the client. Network based software installation is vulnerable to malicious attacks as software products transmitted over the network can be accessed by hackers and spoofers, causing permanent and/or critical damage to the client and/or to the server. The malicious elements can then execute on the client causing damage to the client, and may further be configured to transmit a part of the malicious element back to the server and/or other devices coupled to the network from the client, thereby causing damage to the server and/or other connected devices as well.

In one example the client computing device (client), is coupled to an imaging device (e.g., an ultrasound scanner, a computer tomography scanner, etc.) at a hospital. The client is configured to collect data from the imaging device and generate images based on the collected data, which are then displayed on the imaging device for diagnosis of a patient. To process the data collected into respective images, the client requires imaging software, which is configured to collect data from the imaging device and generate a suitable image. In addition to the imaging software, other software products (e.g., operating system, etc) may also be required. In the example, a new version of the vendor's imaging software is available via the internet, for installation by the client. Preferably, receiving and installing of the new version of the vendor's imaging software at the client is performed as a background task. However, a disadvantage is that software transmitted over the internet (i.e., the vendor's imaging software) is prone to malicious attacks, which might harm the client, server, or other devices in communication with the client or server over the network. A further disadvantage is that the malicious elements may expose critical data (e.g., personal data, financial data, medical data, etc.) to malicious sources.

In another example, the client is coupled to an Automatic Teller Machine (ATM). In addition to running the financial software which needs to update each transaction with a server, the client also includes various other programs (e.g., the operating system). Typically, when the client transmits the request to a bank server, the request is digitally signed by a third party vendor and at the bank server the third party's digital signature needs to be verified before the transaction can be processed. The transactions that are transmitted over the Internet are prone to malicious attacks, where such attacks may compromise critical data associated with the transactions. Also, where the ATM requires installation of a security patch to the financial software product, the server is configured to transmit the security patch to the client. The client receives the security patch and installs the security patch on the client. However, because the security patch is transmitted over the internet it may be vulnerable to malicious attacks. If the security patch were tampered with during transmission, such tampering may result in damage to client, server, or other devices in communication with the client or server over the network. A further disadvantage is that such malicious elements may expose critical data from the client and/or the server. Yet a further disadvantage is that the security patch may need authorization of a third party vendor which consumes resources and is expensive.

U.S. Pat. No. 7,055,036 discloses a system and method for verifying that a peer is a trusted peer using signed receipts in a peer-to-peer network environment. The method generally comprises broadcasting a request over the network by a requesting peer for a task with respect to a remote non-local backend server, receiving a response to the request from the service-providing server, verifying a digital certificate of the response issued by the remote non-local backend server indicating that the responding service-providing server is trusted for the requested task, and forwarding the task to a local alias URL of the responding peer for performance of the task by the responding server if the verifying is successful. The digital certificate may be a 1024-bit VeriSign digital certificate. The verifying ensures that the local alias URL is approved by the non-local backend server for the requested task. A disadvantage is that verifying the digital certificates requires a remote non-local backend server as the digital certificate belongs to a third party and such transmission to a third party server may be intercepted by hacker. Further, it requires significant resources to maintain the non-local backend server for the verification process and is expensive.

Therefore, there is a need for an improved network based installation management system and a secure method preventing malicious alterations to software.

SUMMARY OF THE INVENTION

A first aspect of the invention provides a method for software installation, on a requesting entity, the software being made available to the requesting entity from a servicing entity. This invention discloses a network based installation management system that dynamically manages secure installation of software on a requesting entity. The requesting entity is coupled to a respective servicing entity over a network. The requesting entity is configured to receive an encoded response from a servicing entity. The requesting entity is further configured to authenticate the encoded response received from the servicing entity and then install the encoded response which contains a list of software and a respective information file, the information file containing the security attributes associated with the list of software.

In one embodiment, the requesting entity identifies the necessary software required, and generates a request containing for example a list of software files and other relevant details that are required to be installed on the requesting entity. The requesting entity is configured to encode the request by a hardware element, for example a trusted platform module (TPM) chip, which resides and/or is embedded on the requesting entity. The encoded request is transmitted from the requesting entity to a servicing entity, the servicing entity has a respective hardware element which is configured to decode the encoded request received from the requesting entity.

In a further embodiment, the servicing entity is configured to verify and authenticate the encoded request, the authentication being performed by the respective hardware element. After completing the authentication, the servicing entity prepares a response to be transmitted to the requesting entity. After preparing the response for the receiving entity, the servicing entity is configured to encode the response using the respective hardware element on the servicing entity. After, the response has been encoded by the respective hardware element, the encoded response is transmitted to the requesting entity over the network. The requesting entity is configured to receive the encoded response and subsequently decode and authenticate the encoded response using the respective hardware element on the requesting entity. After verification and authentication of the encoded response is completed at the requesting entity the encoded response containing the required software is installed on the requesting entity.

A second aspect of the invention provides a network based installation management system. An embodiment of the network based installation management system comprises a requesting entity and a servicing entity, each of which contains a respective hardware element. The respective hardware element on the requesting entity and the servicing entity is preferably a trusted platform module (TPM) chip. In one embodiment, the TPM chip on the requesting entity is configured to encode a request generated at the requesting entity. In a further embodiment, the TPM chip on the requesting entity is configured to decode an encoded response received at the requesting entity. In a further embodiment, the TPM chip on the servicing entity is configured to decode the encoded request received by the servicing entity. In yet a further embodiment, the TPM chip on the servicing entity is configured to encode a response prepared by the servicing entity. The requesting entity preferably being coupled to the servicing entity via a transmission medium.

BRIEF DESCRIPTION OF THE DRAWINGS

FIG. 1 depicts an embodiment of a network based installation management system in accordance with the present invention.

FIG. 3A illustrates an exemplary embodiment of the client processing a request.

FIG. 3B illustrates an exemplary embodiment of the client processing an encoded response.

FIG. 4 illustrates an exemplary embodiment of the processing at the server.

FIG. 5 illustrates an exemplary embodiment of a computer system suitable for use with the method of FIGS. 2A, 2B, 3A, 3B, 4 and in the network based installation management system of FIG. 1.

DETAILED DESCRIPTION

Overview

Figure 2A:
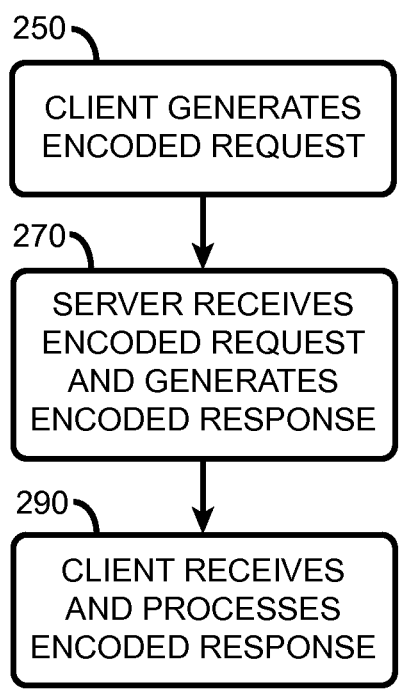
FIG. 2A illustrates an exemplary embodiment of an overview of a method of secure program installation on a network based installation management system.

Where reference is made in any one or more of the accompanying drawings to steps and/or features, which have the same reference numerals, those steps and/or features have for the purposes of this description the same function(s) or operation(s), unless the contrary intention appears. The expression "requesting entity" should be understood as a client, such as a computer device or a handheld device. The expression "servicing entity" should be understood as a server or storage medium on which content may be hosted. The expression "information file" is to be understood as a "database" or "a file", which contains the security attributes associated with the software and/or list of software in the encoded response. The expression "encoded request" is to be understood as a request generated by the client and encoded by the hardware element on the client. The expression "encoded response" is to be understood as a response from the server, which is encoded by a hardware element on the server, wherein the "encoded response" contains a list of software and the associated file. The expression "hardware element" is to be understood as a "trusted platform module (TPM)", where the TPM is a chip, each of the requesting entity and the servicing entity containing a respective TPM. Other equivalent expressions to the above would be apparent to a person skilled in the art.

This invention discloses a network based installation management system that dynamically manages secure installation of software on a client. The client is coupled to a respective server over a transmission medium, for example a network. The client is configured to receive an encoded response from a server containing a list of software and a file, the file containing the security attributes associated with the list of software. For example, in one embodiment the encoded response may be generated by the server automatically or based on a request received from the client. The client is further configured to authenticate the encoded response received from the server, and after authentication of the encoded response is completed, the client is configured to install the encoded response.

In one embodiment, the server may generate the response after receiving an encoded request from the client. The server is configured to service the encoded request of the client. The server prepares a specific response in response to the request received from the client. The response is then encoded by a respective hardware element on the server and subsequently the encoded response is transmitted from the server to the client. On receiving the encoded response, the client is configured to authenticate the encoded response and after authentication is completed, install the encoded response on the client.

In a further embodiment, the server is configured to maintain a list of software already installed on the client. For example, one form of the list of software installed on the system can be an operating system. The server is configured to recognize that the client's software (e.g., the operating system, etc.) requires a security patch, and to send the client an encoded message including the security patch. The encoded message including the security patch is first encoded by the server's TPM chip and subsequently the encoded response is transmitted to the client by initiating, for example a push mechanism or the like. The encoded response is received by the client, authenticated by the client's TPM chip, and after authentication is completed, the client is configured to install the security patch on the client. An advantage of transmitting the encoded response which is encoded by the server is that the encoded response cannot be tampered by hackers and spoofers even when transmitted over an un-trusted network. A further advantage is that even if the patch has been diverted to another client on the network, installation will fail when the client cannot authenticate the response, thereby preventing stealing of software being transmitted over an un-trusted network such as the Internet.

A further advantage is that a highly accurate and reliable program installation may be achieved. The program installation uses the network based installation management system, including a respective hardware element on the client and the server, wherein the respective hardware element on the client and the server is configured to encode and decode information, thereby providing a high level of security and trust, even in an un-trusted network environment.

In a further embodiment, the client contains a requesting agent. The requesting agent may be a hardware based agent or a software based agent resident on the client. The requesting agent is configured to monitor the requesting entity, for example for a software upgrade required to be installed on the client. The requesting agent is configured to initiate the client to generate a request of the required software to be upgraded, encodes the request with the client's TPM chip and then transmits the encoded request to a respective server.

In a further embodiment, the server also contains a servicing agent. The servicing agent may be hardware based agent or a software based agent resident on the server. The servicing agent is configured in one embodiment to service the encoded request of the client. In a further embodiment, the servicing agent is configured to self generate the response, encode the response and transmit the encoded response to the client, such that the encoded response may be installed on the client.

Network Based Installation Management System

FIG. 1 illustrates an exemplary embodiment of a network based installation management system 100 implemented in accordance with the present invention. The network based installation management system 100 comprises a server 110, for example a computer system such as a server or a storage medium, which is configured to deliver content, for example appropriate software, requested by a client 130 and/or to be installed on the client 130. The client 130 and the server 110 are coupled via a transmission medium, for example a network 107, 109, Network 107, 109 may be a wired and/or a wireless network.

Typically, servers 110 are available in many forms such as application servers, web servers, database servers, and so forth. The server 110 typically is a computer system that delivers information and/or software to other computer systems linked over a network. Typically, a client 130 is a computer system and/or a terminal that requests information from another computer and/or a server coupled to a network 107, 109. The server 110 may either reside at the same location of the client 130 or may reside at a remote location, such as the location of a vendor or another third party. In an exemplary embodiment, the client 130 may include one or more assorted electronic devices (e.g., personal computers, mobile phones, personal digital assistant (PDA), tablet computers, a pocket personal computers, etc.), capable of connecting to a server 110, using wired networks, wireless networks, or a combination thereof.

In one embodiment, a typical sequence involves network based installation of a software upgrade required by the client 130. The client 130 is configured to generate a request which contains the required list of software. The request generated at the client 130 for the software upgrade is then encoded by the client's TPM chip 135. The encoded request is then transmitted over the network 107, 109, which may include the Internet 120 as one of the mediums, to a respective server 110 and/or a respective storage device 140, located at the vendor's location, to fetch the software upgrade that is requested by the client 110.

The server 110 is configured to receive the encoded request from the client 130. The encoded request from the client 130 is authenticated by the server's TPM chip 115, wherein the TPM chip 115 verifies whether or not the encoded requested is from a trusted client. In a further embodiment, only the request generated at the client 130, which is transmitted to the server 110 may not be encoded. In this case, the request is received by the server, and the server 110 responds with an encoded response which is transmitted to the client 130, the encoded response is received by the client 130, authenticated by the client's TPM chip 135, and after completion of the authentication, the encoded response is installed on the client 130.

In case the client sends an encoded request, after authentication of the encoded request by the server 110, the server 110 prepares and/or generates a response. In an embodiment, when there is no request from the client, as discussed previously, the server is configured to generate a response and transmit the encoded response to the client. The response generated by the server 110 is specific to the request of the client 130 and/or to specific requests that may be stored on the server. The server's response typically includes the list of software upgrades and a relevant information file, where the relevant information file includes the security attributes associated with each of the listed software upgrades, and the response which is encoded by the Server's TPM chip 115 is transmitted to the client 130 over the network 107, 109.

The client 130 is configured to receive the encoded response from the server 110, and authenticates the encoded response by the client's TPM chip 135. After the client authenticates the encoded response, the client is configured to install the listed software upgrades associated with the encoded response.

Monitoring by Agents

In a further embodiment, the process of monitoring the client 130, preparing the request, encoding the request by the client's TPM chip 135 and transmitting the encoded response to the server 110 can be advantageously performed by a requesting agent 137, which is resident on the client 130. This requesting agent 137 may be also configured to perform other activities for the client 130 as well, such as receiving the encoded response from the server, authenticating the encoded response sent by the server 110 using the client's TPM chip 135 and installing the encoded response on the client 130.

Similarly, the server side processing is performed by a servicing agent 117 residing on the server 110. In one embodiment, the servicing agent 117 is configured to generate the encoded response at the server, transmit the encoded response to the client 130. The encoded response may be generated in response to a request received from the client. In a further embodiment, the servicing agent 117 is also configured to identify the relevant client 130 from the list of clients that is stored on the server. The servicing agent 117 is also configured to receive the encoded request from the client 130 and authenticate the encoded request using the TPM chip 115 embedded in the server. In a further embodiment, the servicing agent 117 is configured to determine a response for a particular client from the list of clients, encode the response and then transmit the encoded response to the identified client 130. In a further embodiment, the servicing agent is configured to poll the list of clients, identify a client 130 that requires a response (e.g. software patch, upgrade etc.), intimate the server 110, prepare the response, encode the response and transmit the response to the identified client 130.

The request may be generated by a requesting agent 137 that is configured to monitor the operating system and the software already installed on the client. The requesting agent 137 is also configured to identify the server 110 from where the upgrade can be downloaded and installed on the client. The client is configured to typically communicate with servers on the network that are embedded with TPM chip 115.

In one embodiment, the encoded request transmitted by the client 130 is received by the server 1 10. The server 110 is configured to authenticate the encoded request, and only if the encoded request is from a trusted source, for example signed by a TPM chip, the server 110 processes the request of the client for the upgraded software. The server 110 prepares a response, which contains the list of requested software and a relevant file, which contains the security attributes associated with each item in the list of requested software. The response prepared by the server 110 is then encoded by the respective TPM chip 115 on the server and then transmitted to the client 110. The processing of the request may be achieved by a servicing agent on the server 110. Once the response is encoded on the server 110, the encoded response is transmitted to the client 130. The client 130 receives the encoded response from the server 110, authenticates the encoded response using the TPM chip 135, and then installs the software on the client. As discussed previously, a requesting agent 137 on the client 130 is configured to process the encoded response received by the client 130. In a further embodiment, the client may send a request that is not encoded. The server however is configured to receive the request, prepare an encoded response and transmit the encoded response back to the client.

Server Controlled Monitoring

In a further embodiment, once the software has been installed on the client 110, a servicing agent 117 on the server 110 is configured to continuously monitor the server for any upgrades to the software. Whenever there is an upgrade of the software available, the server 110 is configured to transmit the upgrade to the client 130. The server 110 maintains a list of the clients 130 and the relevant software installed on the clients 130. When a suitable upgrade is released, the server and/or the servicing agent 117 deployed on the server is configured to generate a list of clients 130 that should be provided with the upgraded software. The server 110 then prepares a response, which contains the list of software to be installed on the client 130 and a relevant information file, which contains the security attributes associated with each of the software that is being transmitted in the response. The response is encoded by the TPM chip 115 on the server and the encoded response is then transmitted to the client 130. The encoded response is received at the client 130, authenticated and then installed on the client 130, if it is from a trusted source. In this embodiment, the client 130 has not requested the server for the required upgrade; however the server itself determines that an upgrade is required on the client 130, prepares an encoded response and initiates transmission of the encoded response to the client 130 over the network (e.g., utilizing a push mechanism).

In a further embodiment, if the server 110 is not able to find the requested update, the server can redirect the query to a storage device 140 coupled to the server 110 via the network 105. The storage device 140 may also directly interact with the client 130 via the network 109. The storage device 140 may be configured to run a servicing agent 117. The servicing agent 117 on the storage device performs the same function as the servicing agent on the server 110.

An advantage of encoding the request at the client 130 and encoding the response at the server 110 is that it reduces the opportunity for hackers and spoofers to introduce malicious elements into the request or response. The TPM chip 135 on the client 130 is configured to encode the request and decode the encoded response. Similarly, the TPM chip 115 on the server 110 is configured to decode the encoded request and encode a response from the server. During transmission over the network, if the encoded request and/or the encoded response is subjected to malicious elements being introduce into either, during the process of decoding, the malicious element would be detected and the process of fetching and installing software will be halted, thereby preventing the client 130 and/or the server 110 from suffering any damages.

TPM Chip/Hardware Element

Trusted computing between the server 110 and the client 130 involves incorporating security measures such as a hardware element (TPM chip) 115, 135 into the core of a computing platform. The TMP chip 115, 135 is a separate and secure piece of hardware, in the form of a processor, chip etc., which is embedded into the server 110 and/or the client 130.

The server 110 includes a respective TPM chip 115 which is arranged to decode the encoded requests received by the server 110. The encoded requests are transmitted by the client 130 and encoded by a TPM chip 135 embedded in the client. The TPM chip 115 is also configured to encode a response prepared/generated by the server 110 prior to being transmitted to the client 130. The encoded response received by the client 130 is decoded by its respective TPM chip 135 to verify the authenticity of the encoded request before the encoded request is installed on the client 110.

It should be apparent to a person skilled in the art, that the TPM chips 115, 135 are made according to specifications recognized by the Trusted Computing Group (TCG) that promotes security across a variety of computing platforms for example in personal computers (PCs), personal digital assistants (PDAs), mobile phones etc. TCG provides specifications for TPM to allow computer administrators to assert ownership of a platform while allowing users the ability to perform specific job functions. The TPM specification defines a core root of trust for measurement (CRTM), wherein the CRTM provides guaranteed compatibility and security among the various different computing platforms involved, such as in the client 130 and the server 110.

The TPM chip 115,135 has a tamperproof packaging and can be used for storing sensitive data like encryption keys, certificates and the like. The TPM chip 115,135 can also be configured for performing sensitive crypto calculations (e.g., symmetric/asymmetric encryption, SHA hashing, key generation, etc.), which may become compromised if performed on the main processor of the server 110 and/or the client 130. The TPM chip 115,135 typically has a unique identifier key that is embedded within the TPM chip 115,135 during the process of manufacturing. The unique identifier key is secure because it cannot be separated from the TPM chip 115, 135 and is typically not exposed to any application on either the server 110 and/or the client 130.

Any content that needs to be encoded, for example content that requires a encoding by the unique identifier key, is accomplished using the TPM chip 115, 135 and by routing the specific content to the respective TPM chip 115, 135, which is configured to encode the content internally and subsequently generate an output which comprises the signed content. An advantage of introducing the TPM chip 115, 135 within the server 110 and the client 130 is that the TPM chip 115, 135 has a unique identifier key and thereby provides an exclusive identity to the platform to which the TPM chip 115,135 is attached. It should be apparent to a person skilled in the art that many devices are coupled in the network based installation management system, and it is advantageous that each of the devices coupled to the network include the TPM chip, to enhance security in the network environment.

Workflow Overview

FIG. 2A illustrates an exemplary embodiment of an overview of a method of secure program installation on a network based installation management system. Typically the client 130 is configured to determine the specific software for example software executables, software upgrades, software patches to be installed and/or new/additional programs to be installed.

In 250, the client 130 identifies the programs and the client 130 triggers or generates a request which includes a list of the software that is required to be installed on the client 130. After the request has been generated, the client 130 encodes the request with the TPM chip 135 embedded in the client 130 forming an encoded request. The encoded request is then transmitted to a relevant server which is identified by the client 130, the request being transmitted to the server 110 over the network. Preparing the encoded request and transmitting the encoded response to the server 110 may be done with or without any human intervention.

In 270, the server 110 receives the encoded request from the client 130 and authenticates the encoded request of the client 130, for example by verifying the encoded request. Once the TPM chip 115 on the server 110 has authenticated the encoded request, the server 110 prepares a response to the request of the client 130. The response includes the list of required software and an information file, which contains the security attributes associated with each of the items in the list of required software. The response prepared by the server 110 is encoded by the TPM chip 115 embedded in the server 110. After the response has been encoded, the server transmits the encoded response to the client 130 over the network. Preparing the encoded response and transmitting the encoded response to the client 130 may be done with or without any human intervention.

In 290, the client 130 receives the encoded response from the server 110. The client 130 is configured to authenticate the encoded response of the server 110 using the TPM chip 135 on the client 130. If the encoded response is found to be authentic, then the client 130 is configured to install the software within the encoded response, onto the client 130. The installation verifies the security attributes and assigns the relevant security attributes to the relevant software included in the encoded response. The installation of the software within the encoded response may be done with or without any human intervention.

In one embodiment, a requesting agent 137 on the client 130 and a servicing agent 117 on the server 110 are configured to perform the process described above, typically when human intervention is not required.

Alternate Workflow Overview

Figure 2B:
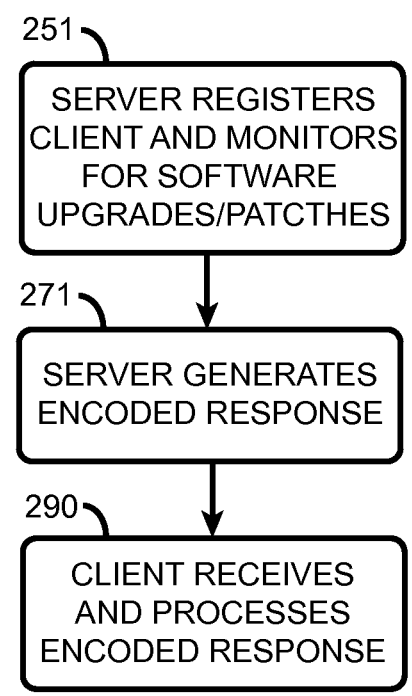
FIG. 2B illustrates an exemplary embodiment of an overview of a method of secure program installation on a network based installation management system.

FIG. 2B illustrates an exemplary embodiment of an overview of a method of secure program installation on a network based installation management system 100. The client 130 is installed with software from a server 110 and/or the installed software on the client 130 is linked to a server 110 to be updated with software upgrades, software patches to be installed and/or additional programs that may become available from time to time.

In 251 the client 130 is registered with the server 110 and the list of software installed on the client 130 is simultaneously registered with the server 110. The server 110 continuously monitors for any software upgrades, software patches and the likes that are required to be installed on the client 130.

In 271, if the server 110 detects that a new software patch, software upgrade or the like has been released, the server 110 prepares a response, which includes the list of required software and an information file containing the security attributes associated with each of the identified software items in the required list. The response prepared by the server 110 is encoded by the TPM chip 115 embedded in the server 110. After the response has been encoded, the server 110 transmits the encoded response to the client 130 over the network 107, 109. Preparing the encoded response and transmitting the encoded response to the client 130 may be done with or without any human intervention.

In 290, the client 130 receives the encoded response from the server 110. The client 130 is configured to authenticate the encoded response of the server 110 using the TPM chip 135 on the client 130. If the encoded response is found to be authentic, then the client 130 is configured to install the encoded response on the client 130. The installation verifies the security attributes and assigns the relevant security attributes to the relevant software included in the encoded response. The installation of the encoded response may be done with or without any human intervention.

In one embodiment, a requesting agent 137 on the client 130 and a servicing agent 117 on the server 110 are configured to perform the process described above, typically when human intervention is not required.

Processing by the Client

FIG. 3A illustrates an exemplary embodiment 250 of a client 130 processing a request. The client 130 is configured to determine and register all the software installed on the client 130. When a software upgrade, software patch or the like is released, typically a notification is sent over the network 107, 109. In 252 the client 130 verifies that the software upgrade, software patch or the like that has been released is required for the client 130. This may be an optional requirement, which may be automated using a script running on the client 130. In 256 the client 130 is configured to prepare a request which includes a list of software that is required to be installed on the client 130. Once the request has been prepared, in 260 the request is encoded by the TPM chip 135 embedded on the client 130, thereby creating an encoded request. In 264, the client 130 transmits the encoded request to a respective server 110. The client 130 is configured to identify a server 110 that can service the encoded request of the client 130 optimally and efficiently, for a number of available servers 110 on the network 107, 109.

FIG. 3B illustrates an exemplary embodiment of the client 130 processing 290 an encoded response. The encoded response is transmitted from the server 110 to the client 130 in response to the request transmitted by the client 130. In 292, the client 130 is configured to receive the encoded response from the server 110. The encoded response includes a list of software and an information file, where the information file contains the security attributes associated with each of the software items included in the list of software. The encoded response is encoded by the TPM chip 115 on the server 110. In 294, the client 130 is configured to authenticate the encoded response by performing the necessary verifications and validations. The encoded response is authenticated by the TPM chip 135 on the client 130. Authentication will fail if malicious elements have been introduced by hackers or spoofers during the process of transmission over the network 107, 109. If the authentication fails, in 298, the installation will halt and the client 130 and/or the server 110 will be notified that the installation was incomplete via an appropriate error message. If the authentication has been completed successfully, in 296 the software associated with the encoded response is installed on the client 130.

The process of preparing a request, encoding the request on the client 130 and transmitting the request from the client 130 to a server 110 may be achieved with or without any manual intervention. Similarly, the process of receiving an encoded response at the client 130 transmitted from the server 110, authenticating the encoded response at the client 130, and installing the encoded response on the client 130 may be achieved with or without any manual intervention. Typically, when manual intervention is not involved, a requesting agent 137 is deployed on the client 130 that can automate the process described above.

Processing at the Server

FIG. 4 illustrates an exemplary embodiment of the processing at the server 110. In 272, the encoded request is received by the server 110. The encoded request is the request that is transmitted from the client 130 over the network 107, 109. In 276, the encoded request received by the server 110 is authenticated by the TPM chip 115 on the server 110. The authentication involves verification and validation of the request sent by the client 110. If the encoded request has been tampered by introducing any malicious elements, in 278 the processing of the request is halted and an appropriate error message is sent to the client 130. After authentication of the encoded response, in 280 the server 110 is configured to prepare an appropriate response for the request of the client 130.

Alternatively, as described previously, the software may be installed from a server 110 or the client 130 along with the relevant software may be registered with an appropriated server 110. In 251, as described previously, the server 110 is configured to monitor for any new software upgrades, software patches and the likes that have been released. The server 110 determines the list of clients that require the software upgrade, patch and the like and transfers control to 280, where an appropriate response is prepared by the server 110.

Once the response has been prepared by the server 110 in 280, the response is encoded in 284, thereby forming an encoded response. The encoded response is formed by encoding the response by the TPM chip 115 on the server 110. In 288, the encoded response is transmitted to the client 130; this transmission can be in response to the request of the client 130 or by initiating a push to the client 130.

The process of preparing the response, encoding the response on the server 110, transmitting the encoded response from the server 110 to the client 130 and monitoring for new releases of software may be achieved with or without any manual intervention. Typically, when manual intervention is not involved, a requesting agent 137 is deployed on the client 130 that can automate the process described above.

Encoded Response

As discussed previously, the encoded response from the server 110 comprises two logical pieces, i.e. the list of software and an information file. The information file contains the security attributes associated with the software listed in the encoded response. For example the information file captures security attributes such as file size, file owner, file group owner, file permissions, links to the file, file's cryptographic hash value, file creation date, file's digital signature etc.

Computer System Overview

FIG. 5 illustrates an exemplary embodiment of a computer system 500 suitable for use with the method described previously and in the network based installation management system 100. The computer system 500 can either be the server and/or the client. It should be understood that FIG. 5 is only intended to depict the representative major components of the computer system 500 and that individual components may have a greater complexity than that represented in FIG. 5.

The computer system 500 comprises a system bus 501. The system 500 further comprises a processor 510, a memory 520, a disk input-output (I/O) adapter 530, a network interface (not shown in the Figure) and a User Interface (UI) adapter 540, where each is coupled to the system bus 501. A disk storage device 531 is operatively coupled to the disk I/O adapter 530.

A keyboard 541 and a mouse 542 are coupled to the UI adapter 540. A display 551 is operatively coupled to the system bus 501 via a display adapter 550.

The network based installation management system 100 may be implemented as a computer program in the form of a requesting agent 137 and/or a servicing agent 117 that is stored in the disk storage device 531 of the client 130 and/or the server 130. The client 130 stores and runs the software, whereas the server 110 stores updated versions of software, upgrades to software, patches to software, or new installations of software, that need to be installed on the client 130. The server 110 also includes an operating system and may include additional software packages (e.g., server software, application software, etc.).

The system 500 can load the program into the memory 520 and execute the program onto the processor 510, either on the server 110 or the client 130. In addition the system 500 is embedded with a TPM chip 515, wherein the TPM chip 515 is configured for encoding a request and decoding a response on the client 130 and encoding a response and decoding a request on the server 110 as described previously.

The user inputs information to the system 500 using the keyboard 541 and/or the mouse 542. The system outputs information to the display device 551 coupled via the display adapter 550. The skilled person will understand that there are numerous other embodiments of the system known in the art and that the present embodiment serves the purpose of illustrating the invention and must not be interpreted as limiting the invention to this particular embodiment.

The disk I/O adapter 530 coupled to the disk storage device 531, in turn, coupled to the system bus 501 and the disk storage devices represents one or more mass storage devices, such as a direct access storage device or a readable/writable optical disk drive. The disk I/O adapter 530 supports the attachment of one or more mass storage devices 531, which are typically rotating magnetic disk drive storage devices, although there could alternatively be other devices, including arrays of disk drives configured to appear as a single large storage device to a host and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), high density DVD (HD-DVD), holography storage systems, blue laser disks, IBM Millipede devices and the like.

The embodiments described with reference to FIGS. 1-5 generally use client-server network architecture. These embodiments are desirable because the clients can utilize the services of the server without the client of the server requiring knowledge of the working details about the other. However, those skilled in the art will appreciate that other network architectures are within the scope of the present invention. Examples of other suitable network architectures include peer-to-peer architectures, grid architectures, and multi-tier architectures. Accordingly, the terms web server and client computer should not be construed to limit the invention to client-server network architectures.

Additional Embodiments of Computer Systems

The network interfaces (not shown in FIG. 5) allow the client 130 and/or the server 110 to communicate with other computing systems over a communications medium (not shown in FIG. 5). The network may be any suitable network or combination of networks and may support any appropriate protocol suitable for communication of data and/or code to/from multiple computing systems. Accordingly, the network interfaces can be any device that facilitates such communication, regardless of whether the network connection is made using present day analog and/or digital techniques or via some networking mechanism of the future. Suitable communication media include, but are not limited to, networks implemented using one or more of the IEEE (Institute of Electrical and Electronics Engineers) 802.3x "Ethernet" specification; cellular transmission networks; and wireless networks implemented one of the IEEE 802.11x, IEEE 802.16, General Packet Radio Service ("GPRS"), FRS (Family Radio Service), or Bluetooth specifications. Those skilled in the art will appreciate that many different network and transport protocols can be used to implement the communication medium. Transmission Control Protocol/Internet Protocol ("TCP/IP") suite contains suitable network and transport protocols.

If the client 130 and/or the server 110 are located on the same site as the client 130 and coupled via a network 107, 109, the network may be a wired network, wireless network, or a combination thereof. For example a wired network couples the server 110 and the client 130 via cable, optical fiber and the like, and a wireless network couples the server 110 to the client 130 using one or more wireless standard such as Bluetooth, digitally enhanced cordless telecommunication (DECT), dedicated short range communication (DSRC), HIPERLAN, HIPERMAN, IEEE 802.11x, IrDA, Radio frequency Identification (RFID), WiFi, WiMax, xMax, ZigBee and the like.

Alternate Embodiments

Reference is now made to FIG. 1, wherein in an alternate embodiment, if the server 110 in the network based installation management system 100 cannot service the request of the client 110, the server 110 is configured to redirect the encoded request of the client 130 to another server or a storage system 140 in the same network or an alternative network. It should be apparent to a person skilled in the art, that the servers 110, storage devices 140 and client 110 each have a respective TPM 115, 135, 145 for encoding and decoding a request and/or a response.

For example, in one embodiment, if the encoded request generated by the client 130 cannot be serviced by an identified server 110, the server 110 is configured to redirect the encoded request to another server and/or a storage device 140, where the storage device includes an embedded TPM chip 145. Once the server 110 redirects the encoded request to the storage device 140, the storage device 140 is configured to perform the required authentication as described previously in the case of a server, and the storage device 140 is arranged to either directly interact with the server 110 which transmitted the encoded request and/or is configured to interact directly with the client 130 via a wired network, a wireless network or a combination thereof 109. In this scenario, instead of the server 110 servicing the request of the client 130, the storage device 140 services the request of the client 130.

In a further embodiment, the server 110 is configured to monitor the necessary releases (e.g., software patches, software version upgrades, etc.). If a new release is identified by the server 110, the server 110 may perform the role of a mediatory between the client 130 and the storage device 140. In this scenario, the server 110 prepares an encoded request to the storage device 140. The storage device 140 receives the encoded request from the server 110, authenticates the request and prepares an encoded response for the client 130. The encoded response from the storage device 140 may be directly transmitted to the server 110 which in turn transmits the encoded response to the client 130 and/or the storage device 140 is configured to transmit the encoded response to the client 130 directly.

Upon receiving the encoded response from the storage device 140, the client 110 authenticates the encoded response received from the storage device 140. Here, the encoded response may be received from either the storage device 140 and/or via the server 110. It should also be apparent to a person skilled in the art that a variety of devices may be coupled to the server 110 which may interact directly or indirectly with the client 130. Here, whether the variety of devices coupled to the server 110 can interact with the client 130 is dependent on whether the devices have a TPM chip 135 installed as have been discussed previously.

EXAMPLES AND ILLUSTRATIONS

Consider computer imaging software that has been installed in a hospital on a client 130 which is coupled to a Computer Tomography, Ultrasound, Magnetic Resonance instruments and the like. The imaging software forms a crucial part of the system as the imaging software reads data from the instruments connected to the client 130 and is then configured to generate a suitable image for the Medical Practitioner to interpret. At the same time data collected from a patient on the client 130 by the instrument must be maintained confidential.

The imaging software is installed on the client 130 and interfaced with the instrument to collect data and generate suitable images.

Case 1:

The imaging software is registered with a server 110 such that when a new version of the imaging software is released; there can be an automated update of the imaging software on the client 130. In this example case, a new version of the imaging software has been developed and is ready for installation on the client 130. While monitoring for new software releases, the server 110 detects that a new version of the imaging software has been released. The server 110 also detects that clients at several locations need the new version of the imaging software.

The server 110 prepares a response, which contains the new version of the imaging software and the information file, the information file containing security attributes other attributes associates with the imaging software files. The response is encoded by a TPM chip 115 on the server 110 and then transmitted to the identified clients 130 by the server 110. On receiving the encoded response, the client 130 authenticates the encoded response by the TPM chip 135 on the client 130 and after verification installs the new version of the imaging software.

Case 2:

In another embodiment, the server 110 broadcasts to all registered clients that a new version of the imaging software has been released. The client 130 then generates an encoded request which is transmitted to the server 110. The client 130 may request only a part of the new version of the imaging software. The server 110 authenticates the encoded request, and prepares the response, which contains the new part of the imaging software released and the relevant information file, and then encodes the response. The encoded response is transmitted to the requesting client 130. The client 130 authenticates the encoded response received and after verification is completed, installs the requested software on the client 130.

In another embodiment, the imaging software is registered with a server 110. Vulnerability has been detected with the imaging software, wherein the patient data is not confidential.

Case 1:

The client 130 has detected that the patient data is no longer confidential and a request is generated at the client 130 for a security patch to overcome the vulnerability detected. The request is encoded by the TPM chip 135 on the client 130 and then transmitted to the server 110. The server 110 receives the encoded request from the client 130 and authenticates the encoded request from the client 130, and immediately prepares a response containing the required software and the information file with the associated attributes to be transmitted to the client 130. The response is encoded by the TPM chip 115 on the server 110 and then transmitted to the client 130. On receiving the encoded response from the server 110, the client 130 authenticates the encoded response and after authentication is completed, installs the security patch on the client to plug the vulnerability.

Case 2:

The imaging software company has detected that the software in use is vulnerable to attack by hackers and patient data is at risk. A security patch has been prepared to plug the vulnerability. The server 110 which is continuously monitoring for such information that is released immediately identifies the list of clients that such a critical security patch to be installed and prepares a response which contains the security patch software and the information file with the associated security patches. The response prepared is encoded by the TPM chip 115 on the server 110 and then transmitted to each of the clients that has been determined by the server which require the security patch to be installed. On receiving the security patch, the client first authenticates the encoded response by the TPM chip 135 on the client 130 and after verification is completed, installation of the security patch is completed.

The examples described above are only for the purpose of illustrations and the invention can be used in a variety of domains such as financial trading over the internet, financial trading in an ATM, Banking software, Windows X Operating System®, LINUX®, UNIX® and a variety of other applications wherein client criticality is involved. For example, a Windows Mobile® Operating System operating on a portable electronic device such as a PDA or mobile phone. Here, a security patch might be released for the Windows Mobile windows® operating system. The server 110 is configured to broadcast all service providers with a message that a security patch has been released for the Windows Mobile® Operating System. Alternatively, each phone with the Windows Mobile® Operating System is registered with a server 110. As soon as the security patch is released, the server 110 prepares an encoded response and transmits to each of the clients 130 registered with the server 110. The client 130 receives the encoded response, authenticates the encoded response and installs the security patch on the client 130.

The accompanying figures and this description depict and describe embodiments of the present invention, features, and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A method for installing software over a network comprising:
   generating, by a requesting agent in a client, a request for a software update to be installed on the client, the request being digitally encoded by a first trusted hardware element in the client to provide a secure encoded request, the requesting agent being external to the first trusted hardware element in the client, the request for a software update being a request for an update to software on the client other than in the trusted hardware element;
   transmitting, by the client, the secure encoded request over the network to a server;
   receiving, by the server, the secure encoded request;
   generating, by a servicing agent in the server in response to the request for a software update encoded in the secure encoded request, a response that is digitally coded by a second trusted hardware element in the server to provide a secure encoded response, the secure encoded response including a list of software and an associated information file containing security attributes associated with the list of software, the servicing agent being external to the second trusted hardware element in the server;
   transmitting, by the server, the secure encoded response over the network to the client;
   receiving, by the client, the secure encoded response;
   authenticating, by the first trusted hardware element in the client, the secure encoded response;
   installing, by the client, the secure encoded response on the client other than in the trusted hardware element; and
   configuring the requesting agent on the client to monitor for a software upgrade required to be installed on the client and to generate the secure encoded request for the software upgrade at the client.

2. The method of claim 1, wherein the first trusted hardware element is a trusted platform module and the second trusted hardware element is a trusted platform module.

3. The method of claim 2, further comprising:
   authenticating, by the server, the secure encoded request.

4. The method of claim 3, further comprising: a servicing agent at the server configured to monitor, compute and generate the secure encoded response, and transmit the secure encoded response; wherein the secure encoded response includes the list of software and the respective information file containing the associated security attributes with the software.

5. The method of claim 4, wherein the server is configured to initiate pushing the secure encoded response to the client over the network.

6. An installation management system comprising:
   a network;
   a server coupled to the network; and
   a requesting agent in a client, coupled to the network, that generates a request for a software update to be installed on the client, the request being digitally encoded by a first trusted hardware element in the client to provide a secure encoded request, the request for a software update being a request for an update to software on the client other than in the trusted hardware element, wherein the client is configured to transmit the secure encoded request over the network to the server;

the server being configured to receive the secure encoded request, the server being further configured with a servicing agent that generates a response that is digitally coded by a second trusted hardware element in the server to provide a secure encoded response, the secure encoded response including a list of software and an associated information file containing security attributes associated with the list of software, the server being further configured to transmit the secure encoded response over the network to the client;

the client being configured to receive the secure encoded response and such that the first trusted hardware element authenticates the secure encoded response, the client being further configured to install the secure encoded response on the client other than in the trusted hardware element, the requesting agent on the client being configured to monitor for a software upgrade required to be installed on the client and to generate the secure encoded request for the software upgrade at the client.

7. The installation management system of claim 6, wherein the first trusted hardware element and the second trusted hardware element are both trusted platform modules.

8. The installation management system of claim 7, wherein the requesting agent is further configured to:
receive the secure encoded response;
authenticate the secure encoded response; and
install the secure encoded response on the client without any human intervention, wherein the secure encoded response includes the list of software and associated information file containing the security attributes associated with the list of software.

9. The installation management system of claim 7, wherein the servicing agent in the server is further configured to generate the secure encoded response on the server without any human intervention, wherein the secure encoded response includes the list of software and associated information file containing the security attributes associated with the list of software.

10. The installation management system of claim 9, wherein the server is configured to initiate pushing the secure encoded response to the client over the network.

* * * * *